US011319009B2

(12) United States Patent
Derr et al.

(10) Patent No.: US 11,319,009 B2
(45) Date of Patent: May 3, 2022

(54) TOOLING SYSTEM AND METHOD FOR ASSEMBLING A VEHICLE DRIVELINE COMPONENT

(71) Applicant: AMERICAN AXLE & MANUFACTURING, INC., Detroit, MI (US)

(72) Inventors: James R. Derr, Livonia, MI (US); Bryan N. Waineo, Northville, MI (US); Tyler D. Jezowski, Farmington Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/329,290

(22) Filed: May 25, 2021

(65) Prior Publication Data

US 2022/0001944 A1 Jan. 6, 2022

Related U.S. Application Data

(60) Provisional application No. 63/048,382, filed on Jul. 6, 2020.

(51) Int. Cl.
| | |
|---|---|
| *B62D 65/10* | (2006.01) |
| *B23P 19/04* | (2006.01) |
| *F16H 57/00* | (2012.01) |
| *B62D 65/02* | (2006.01) |

(52) U.S. Cl.
CPC .............. *B62D 65/10* (2013.01); *B23P 19/04* (2013.01); *B62D 65/022* (2013.01); *F16H 2057/005* (2013.01); *F16H 2057/0043* (2013.01); *F16H 2057/0062* (2013.01)

(58) Field of Classification Search
CPC ........... Y10T 29/49682; Y10T 29/4971; Y10T 29/49679; F16C 43/04; F16C 43/045; F16C 43/06; F16C 43/065; F16C 43/00
See application file for complete search history.

(56) References Cited

U.S. PATENT DOCUMENTS

| | | | | |
|---|---|---|---|---|
| 3,034,839 | A | * | 5/1962 | Schoos .................... F16C 43/04 384/492 |
| 3,116,543 | A | * | 1/1964 | Schoos .................... F16C 33/62 29/898.062 |

(Continued)

*Primary Examiner* — Jason L Vaughan
*Assistant Examiner* — Amanda Kreiling
(74) *Attorney, Agent, or Firm* — Burris Law, PLLC

(57) ABSTRACT

A method of assembling a vehicle driveline component that includes: positioning a rotary component and first race member on a fixture such that the first race member is concentric with a first race of the component; offsetting the first race member along the rotational axis relative to the first race; providing an annular bearing arrangement having balls and spacers; positioning the arrangement such that the centers of the balls are along a loading cylinder disposed concentrically about the rotational axis; moving the arrangement so the balls seat in the first race and the centers are distributed along an installation circle that is: a) larger in diameter than the loading cylinder if the first race is an outer race of a bearing assembly; or b) smaller in diameter than the loading cylinder if the first race is an inner race of a bearing assembly. A related tooling system is also provided.

10 Claims, 10 Drawing Sheets

(56) References Cited

U.S. PATENT DOCUMENTS

| | | | |
|---|---|---|---|
| 3,139,666 A * | 7/1964 | Leciejewski | F16C 43/04 29/523 |
| 3,824,658 A * | 7/1974 | Donahue | F16C 43/08 29/898.15 |
| 2001/0020330 A1 * | 9/2001 | Chiba | F16C 43/06 29/898.062 |

* cited by examiner

TOOLING SYSTEM AND METHOD FOR ASSEMBLING A VEHICLE DRIVELINE COMPONENT

CROSS-REFERENCE TO RELATED APPLICATIONS

This application claims the benefit of U.S. Provisional Patent Application No. 63/048,382 filed Jul. 6, 2020, the disclosure of which is incorporated by reference as if fully set forth in detail herein.

FIELD

The present disclosure relates to a tooling system and method for assembling a vehicle driveline component and more specifically for assembling bearings of the vehicle driveline component.

BACKGROUND

The statements in this section merely provide background information related to the present disclosure and may not constitute prior art.

A driveline component can include rotational components (e.g., shafts, input pinions, ring gears) supported by bearings. For example, an axle assembly typically includes an input pinion supported by one or more input pinion bearings and a ring gear supported by one or more ring gear bearings. Such bearings typically include a plurality of bearing elements (e.g., tapered rollers) surrounded by an inner bearing race and an outer bearing race. The inner and outer bearing races are typically separate components from the rotational component and the entire bearing assembly (i.e., the inner race, the outer race, and the bearing elements) is installed as a unit onto the rotational component or into a housing into which the rotational component is then inserted. While such configurations may be suitable for some applications, such configurations can be difficult or costly to assemble and the number of parts involved can make it difficult to conform to reduced space requirements of other applications.

In some other applications, the bearing elements are bearing balls and the inner or outer bearing race is machined into the rotational component so that the inner or outer bearing race is integral to the rotational component. However, such a configuration can be difficult and costly to assemble and typically requires the bearing elements and opposite bearing race to be assembled onto the rotational component by hand and may require the bearing to be assembled while the rotational component is being positioned in the housing.

The present disclosure addresses these and other issues with assembling typical driveline components with bearings.

SUMMARY

This section provides a general summary of the disclosure and is not a comprehensive disclosure of its full scope or all of its features.

In one form, a method of assembling a vehicle driveline component includes providing a rotary component having a component body, a plurality of gear teeth and a first bearing race. The component body has a rotational axis. The gear teeth and the first bearing race are fixedly coupled to the component body. The method further includes providing a first race member of a second bearing race, positioning the rotary component and the first race member of the second bearing race on a first assembly fixture such that the first race member of the second bearing race is located on the first assembly fixture concentric with the first bearing race. The method further includes offsetting the first race member of the second bearing race along the rotational axis relative to the first bearing race and providing an annular bearing arrangement having a plurality of bearing balls and a plurality of spacers, each of the spacers being disposed between an associated pair of the bearing balls. The method further includes positioning the annular bearing arrangement such that the centers of the bearing balls are distributed along a loading cylinder that is disposed concentrically about the rotational axis. The method further includes moving the annular bearing arrangement so that the plurality of bearing balls seat in the first bearing race and the centers of the bearing balls are distributed along an installation circle that is disposed concentrically about the rotational axis, the installation circle being: a) larger in diameter than the loading cylinder if the first bearing race is an outer bearing race of a bearing assembly; or b) smaller in diameter than the loading cylinder if the first bearing race is an inner bearing race of a bearing assembly. According to a variety of alternate forms: the method further includes arranging the plurality of bearing balls and the plurality of spacers into the annular bearing arrangement on a second assembly fixture so that the centers of bearing balls are distributed along a staging cylinder having a diameter that is equal to the diameter of the loading cylinder, and removing the annular bearing arrangement from the second assembly fixture before positioning the annular bearing arrangement concentrically about the rotational axis; the loading cylinder is smaller in diameter than the installation circle, wherein when the centers of the bearing balls of the annular bearing arrangement are distributed along the loading cylinder the plurality of bearing balls includes a set of first balls and a set of second balls, wherein the first balls are axially offset from the second balls, and wherein each first ball is disposed circumferentially between a corresponding pair of the second balls; the first bearing race is unitarily and integrally formed with the component body; the plurality of gear teeth are unitarily and integrally formed with the component body; providing the annular bearing arrangement includes arranging the bearing balls and the spacers into the annular bearing arrangement on a second assembly fixture; positioning the annular bearing arrangement includes operating a robotic arm to move the annular bearing arrangement from the second assembly fixture to the first assembly fixture; offsetting the first race member of the second bearing race along the rotational axis includes lowering the first race member of the second bearing race, and wherein moving the annular bearing arrangement so that the plurality of bearing balls seat in the first bearing race includes releasing the annular bearing arrangement from a holder such that the bearing balls and spacers of the annular bearing arrangement drop into the first bearing race; the method further includes forming a subassembly that comprises the rotary component, the annular bearing arrangement, and the first and second races, wherein the subassembly is configured such that the bearing balls of the annular bearing arrangement are disposed between and abut the first bearing race and the first race member of the second bearing race; the method further includes installing the subassembly as a unit to a housing, wherein the first race member of the second bearing race is mounted directly to the housing.

In another form, a tooling system for assembling a subassembly to a housing includes a first assembly fixture, and an assembly machine. The subassembly includes a component body, a plurality of gear teeth, a first bearing race, a first race member of a second bearing race, and a bearing arrangement. The component body is rotatable about a rotary axis, the plurality of gear teeth and the first bearing race is fixedly coupled to the component body. The first race member of the second bearing race is disposed concentrically about the rotational axis. The bearing arrangement includes a plurality of bearing balls and a plurality of spacers. Each of the spacers is disposed between an adjacent pair of the bearing balls. The first assembly fixture includes a first support structure and a second support structure. The first support structure is configured to support the rotary component. The second support structure is configured to support the first race member of the second bearing race concentrically about the rotational axis of the rotary component. The second support structure is movable relative to the first support structure between a first support position and a second support position. Movement of the second support structure between the first and second support positions translates the first race member of the second bearing race relative to the first bearing race along the rotational axis. The assembly machine includes a first alignment member and a second alignment member. The first alignment member defines a loading axis and a first cylindrical alignment surface disposed concentrically about the loading axis. The second alignment member is disposed concentrically about the loading axis and has a race abutment surface that is configured to abut an axial end of the first race member. The second alignment member is movable relative to the first alignment member along the loading axis between a first position and a second position. The first cylindrical alignment surface and the second alignment member cooperate to define an annular chamber configured to receive the bearing arrangement such that the plurality of bearing balls and the plurality of spacers are disposed in an annular bearing arrangement that is centered about the loading axis. When the second alignment member is in the second position an end of the first cylindrical alignment surface and an end of the second alignment member are spaced apart a greater distance than when the second alignment member is in the first position such that when in the first position the annular bearing arrangement is retained in the annular chamber and when in the second position the annular bearing arrangement is free to exit the annular chamber through an annular gap between the end of the first cylindrical alignment surface and the end of the second alignment member. According to a variety of alternate forms: a diameter of the first cylindrical alignment surface is either: a) equal to or larger than a diameter of an end of the first bearing race if the first bearing race is an inner bearing race of a bearing assembly, or b) equal to or smaller than a diameter of an end of the first bearing race if the first bearing race is an outer bearing race of a bearing assembly; the second alignment member is disposed about the first cylindrical alignment surface and the second alignment member includes a ramp that tapers radially inward toward the end of the second alignment member; the assembly machine further includes a push sleeve disposed concentrically between the first cylindrical alignment surface and the second alignment member, the push sleeve being movable along the loading axis relative to the first alignment member and the second alignment member between a retracted position and an extended position, wherein in the extended position the push sleeve is disposed further into the annular chamber than when in the retracted position; the assembly machine further includes a first biasing member and a second biasing member, the first biasing member biasing the first alignment member in a first axial direction relative to the push sleeve, the second biasing member biasing the second alignment member in the first axial direction relative to the push sleeve; the first cylindrical alignment surface is disposed about the second alignment member and the second alignment member includes a ramp that tapers radially outward toward the end of the second alignment member; the assembly machine further includes a push sleeve disposed concentrically between the first cylindrical alignment surface and the second alignment member, the push sleeve being movable along the loading axis relative to the first alignment member and the second alignment member between a retracted position and an extended position, wherein in the extended position the push sleeve is disposed further into the annular chamber than when in the retracted position; the assembly machine further includes a first biasing member and a second biasing member, the first biasing member biasing the first alignment member in a first axial direction relative to the push sleeve, the second biasing member biasing the second alignment member in the first axial direction relative to the push sleeve; the assembly machine includes a clamp member movable between a first clamp position and a second clamp position, wherein when the clamp member is in the first clamp position the clamp member engages the second alignment member to couple the second alignment member to the first alignment member, and when the clamp member is in the second clamp position the clamp member is disengaged from the second alignment member and the second alignment member is decoupled from the first alignment member; the assembly machine includes tool configured to pick up and move the rotary component with the annular bearing arrangement disposed between the first bearing race and the first race member of the second bearing race.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
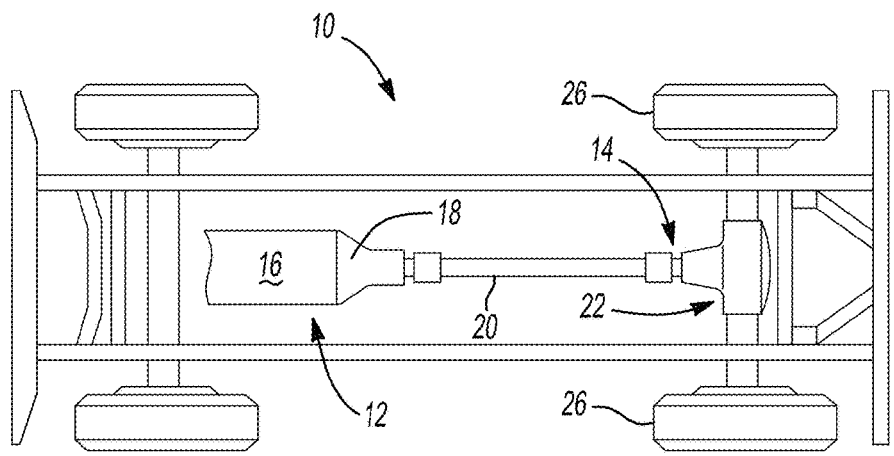
FIG. 1 is a schematic plan view of an example vehicle including a driveline component assembled according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a vehicle having an exemplary vehicle driveline component constructed in accordance with the teachings of the present disclosure is generally indicated by reference numeral 10. In the particular example provided, the vehicle driveline component is an axle assembly (and more specifically, a rear axle assembly), but it will be appreciated that the teachings of the present disclosure have application to various other types of vehicle driveline components, such as power take-off units, and drive units that are fully, partly or alternately powered with an electric motor, for example.

The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a propshaft 20 and an axle assembly 22 (e.g., the rear axle assembly). The propshaft 20 can couple the transmission 18 to the axle assembly 22 such that rotary power output of the transmission 18 is received by the axle assembly 22. The axle assembly 22 can distribute the rotary power to a set of drive wheels (e.g., rear vehicle wheels 26).

Figure 2:
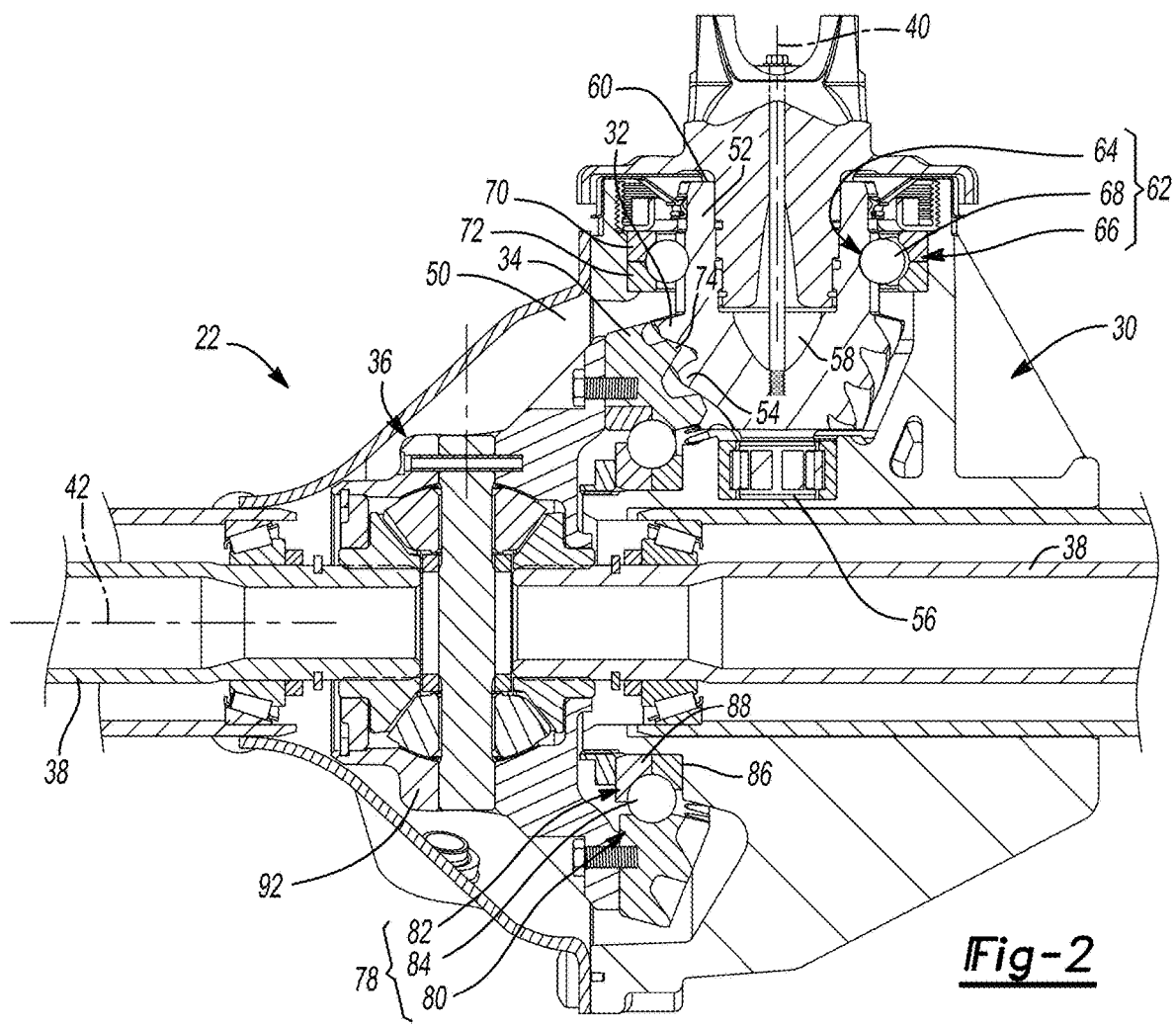
FIG. 2 is a cross-sectional view of the driveline component of FIG. 1.

Referring to FIG. 2, the axle assembly 22 can include a housing assembly 30, an input pinion 32, a ring gear 34, a differential assembly 36, and a pair of axle shafts 38. In the example provided, the axle assembly 22 is constructed as described in U.S. Pat. No. 10,487,933, the entirety of which is incorporated herein by reference, though other configurations may be used. In general, the input pinion 32 is a rotary component that can be rotatable about a first axis 40, while the ring gear 34 is another rotary component and, along with the differential assembly 36, can be rotatable about a second axis 42 that can be transverse or perpendicular to the first axis 40.

The housing assembly 30 defines a differential cavity 50 into which the differential assembly 36 is received. The input pinion 32 is received in the differential cavity 50 and includes a shaft 52 (i.e., a component body) and a plurality of pinion teeth 54 (i.e., gear teeth) proximate to one axial end 56 of the shaft 52. The input pinion 32 can define an internal cavity 58 that opens through an opposite axial end 60 of the shaft 52. The input pinion 32 can be drivingly coupled to the propshaft 20 (FIG. 1) to receive input torque therefrom.

A pinion bearing 62 supports the input pinion 32 for rotation relative to the housing assembly 30 about the first axis 40. The pinion bearing 62 can have an inner bearing race 64, an outer bearing race 66, and a plurality of pinion bearing elements 68 that are disposed circumferentially about the first axis 40. In the example provided, the pinion bearing elements 68 are spherical bearing balls 68a (labeled in FIG. 6) and generally cylindrical spacers 68b (shown in FIG. 6) having concave surfaces (not specifically shown) that engage adjacent bearing balls 68a (labeled in FIG. 6), though other configurations could be used. In the example provided, the inner bearing race 64 is unitarily and integrally formed (e.g., machined) into the shaft 52 of the input pinion 32. The outer bearing race 66 is disposed about the inner bearing race 64. In the example provided, the outer bearing race 66 can have a first outer race member 70 and a second outer race member 72. The pinion bearing elements 68 are disposed between the inner bearing race 64 and the outer bearing race 66 and the bearing balls 68a can be in contact with the inner and outer bearing races 64, 66.

The ring gear 34 is received in the differential cavity 50 and includes a plurality of ring gear teeth 74 that are meshingly engaged to the pinion teeth 54. The ring gear 34 can be a bevel gear (e.g., a spiral bevel gear, such as a hypoid gear).

A ring gear bearing 78 supports the ring gear 34 for rotation relative to the housing assembly 30 about the second axis 42. The ring gear bearing 78 has an outer bearing race 80, an inner bearing race 82, and a plurality of ring gear bearing elements 84. In the example provided, the ring gear bearing elements 84 are spherical bearing balls 84a (labeled in FIG. 11) and generally cylindrical spacers 84b (shown in FIG. 11) having concave surfaces (not specifically shown) that engage adjacent bearing balls 84a (labeled in FIG. 11), though other configurations could be used. The inner bearing race 82 is radially inward of the outer bearing race 80 and the bearing balls 84a can contact the outer and inner bearing races 80, 82. In the example provided, the outer bearing race 80 is unitarily and integrally formed (e.g., machined) into the ring gear 34. Alternatively, the outer bearing race 80 can be configured as described in U.S. Pat. No. 10,487,933, with a first race member integrally formed with the ring gear 34 and a separate second race member coupled to the ring gear 34. Returning to the example provided in FIG. 2, the inner bearing race 82 can include a first inner race member 86 and a second inner race member 88.

The differential assembly 36 can be drivingly coupled to the axle shafts 38 which can be drivingly coupled to drive wheels of a vehicle (e.g., the rear wheels 26 shown in FIG. 1) and the differential assembly 36 can be configured to permit speed differentiation between the two axle shafts 38. In the example provided, the ring gear 34 is fixedly coupled to an input 92 (e.g., the differential case) of the differential assembly to provide input torque thereto.

Figure 3:
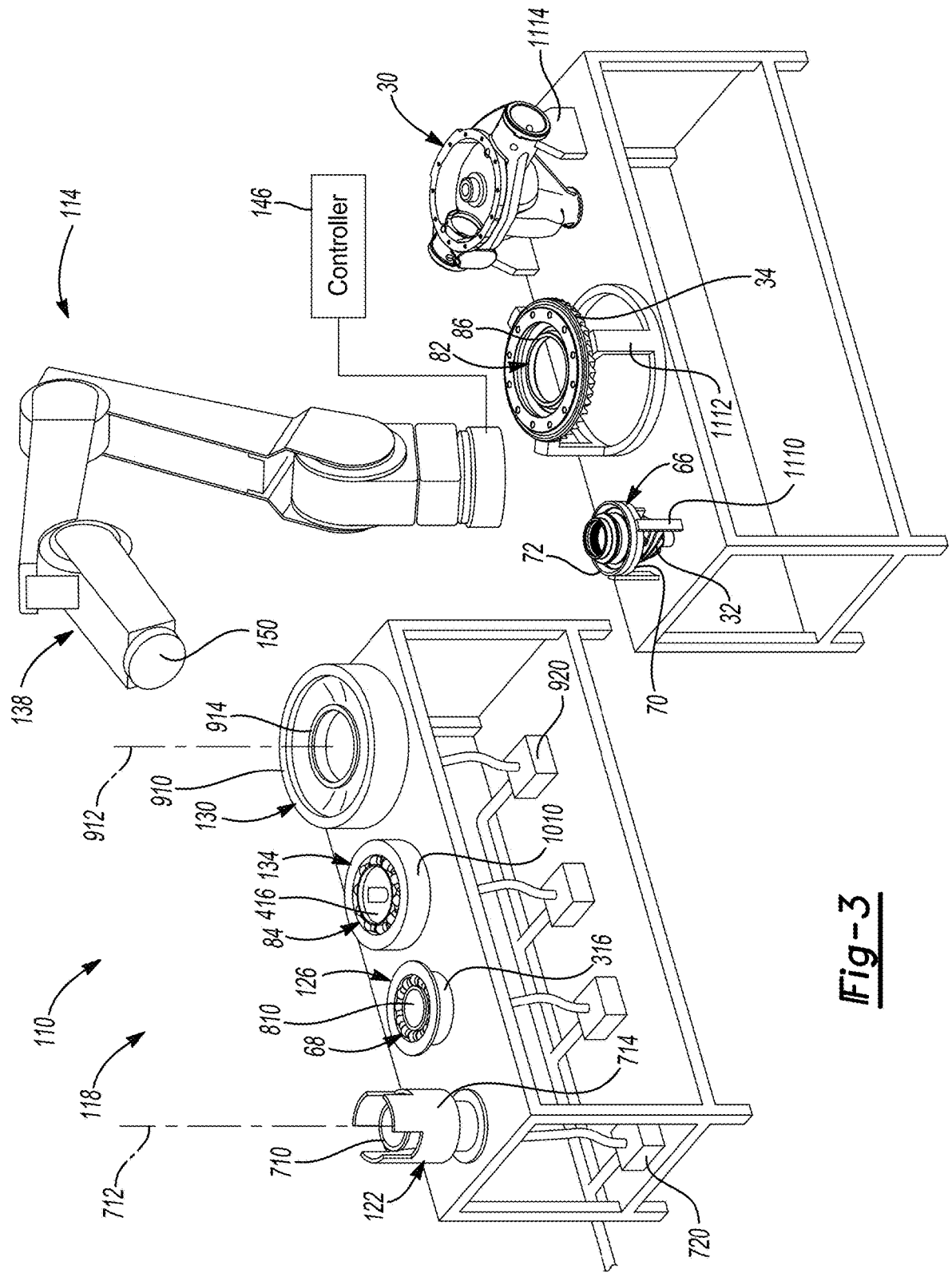
FIG. 3 is a tooling system for assembling a driveline component according to the teachings of the present disclosure.

Referring to FIG. 3, a tooling system 110 for assembling a driveline component such as the axle assembly 22 (FIG. 2) is illustrated. While described with reference to the rear axle assembly 22, those of skill in the art will appreciate that the teachings of the present disclosure are applicable to other arrangements, such as front axle assemblies, central differentials, power take-off units, or transfer cases, for example. The tooling system 110 can include an assembly machine 114 and a plurality of assembly fixtures 118. In the example provided, the plurality of assembly fixtures 118 includes a pinion fixture 122, a pinion bearing fixture 126, a ring gear fixture 130, and a ring gear bearing fixture 134.

Figure 4:
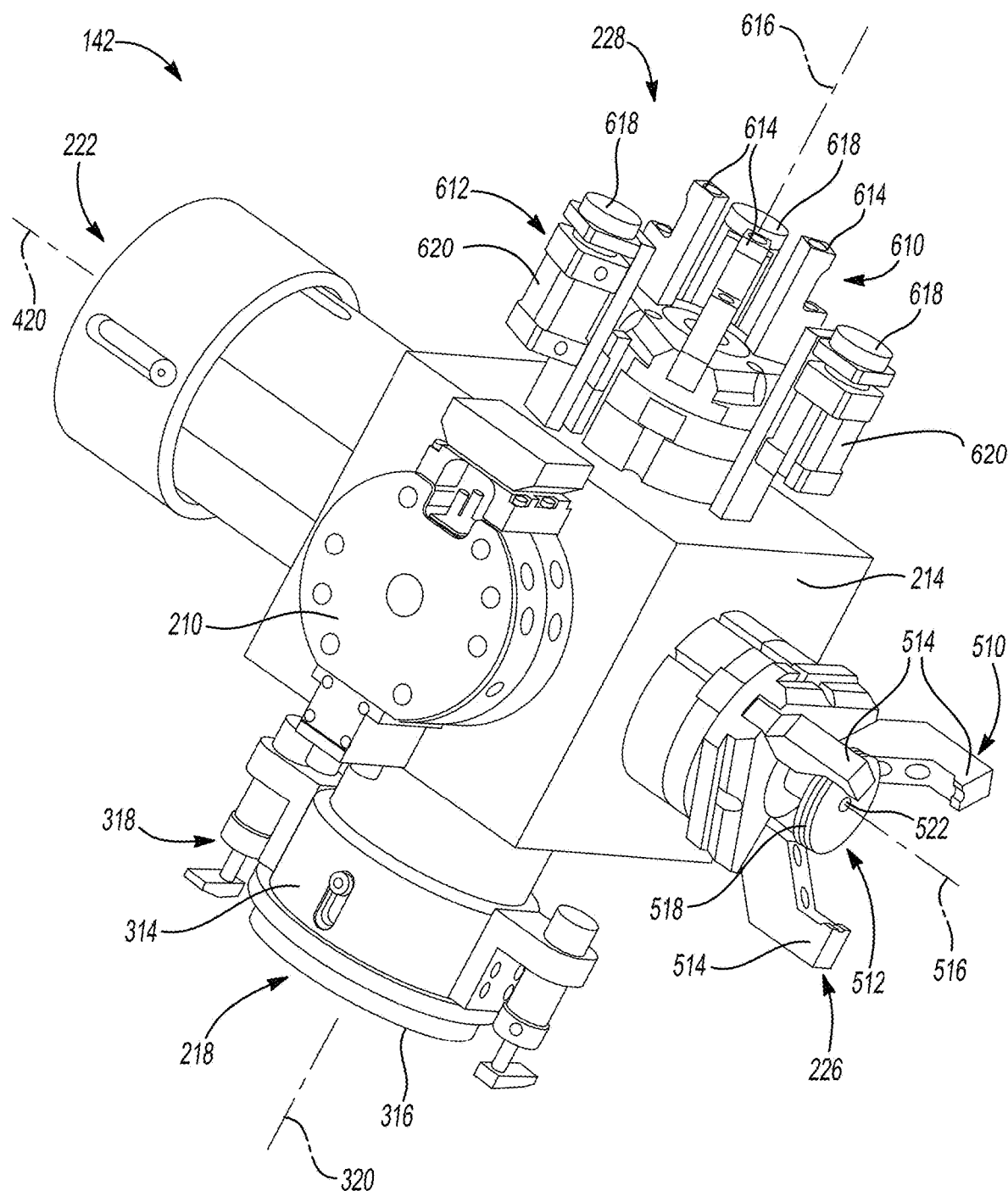
FIG. 4 is a perspective view of tool assembly of the tooling system of FIG. 3.

The assembly machine 114 includes a positioning device 138, a tool assembly 142 (shown in FIG. 4) coupled to the positioning device 138, and a controller 146 in communication with the positioning device 138 and the tool assembly 142 (FIG. 4). The controller 146 is configured to operate the positioning device 138 to move the tool assembly 142 (FIG. 4) and to operate the tool assembly 142 (FIG. 4) to manipulate components as described below. In the example provided, the positioning device 138 is an autonomous multi-axis robotic arm and the tool assembly 142 (FIG. 4) is an end effector assembly, though other configurations can be used such as a robotic gantry or lift assist device for example. The assembly machine 114 may include a mount 150 configured to removably couple the positioning device 138 to the tool assembly 142 (FIG. 4). The mount 150 can be configured to supply pneumatic power, vacuum suction, electrical power, and/or electrical signals to the tool assembly 142 (FIG. 4).

Referring to FIG. 4, an example of the tool assembly 142 is illustrated. The tool assembly 142 can include a mating mount 210 configured to be removably coupled to the mount 150 (FIG. 3) to be moved by the positioning device 138 (FIG. 3) and to receive compressed air, vacuum suction, electrical power and/or electrical signals therefrom. In the example provided, the tool assembly 142 also includes a base 214, a first tool 218 (e.g., a first end effector), a second tool 222 (e.g., a second end effector), a third tool 226 (e.g., a third end effector), and a fourth tool 228 (e.g., a fourth end effector). The tools 218, 222, 226, 228 and the mating mount 210 are each coupled to different sides of the base 214.

Those of skill in the art will appreciate that the teachings of the present disclosure are applicable to configurations with different numbers of tools coupled to the base 214 of the tool assembly 142, such as only one of the tools 218, 222, 226, 228, any two of the tools 218, 222, 226, 228, or any three of the tools 218, 222, 226, 228 being supported by the base. In one alternative, not specifically shown, each tool 218, 222, 226, 228 has its own mating mount 210 and the positioning device 138 is configured to swap between tools 218, 222, 226, 228. In another alternative configuration, not specifically shown, the tooling system 110 can include more than one positioning device with each moving one or more of the tools 218, 222, 226, 228.

Figure 5:
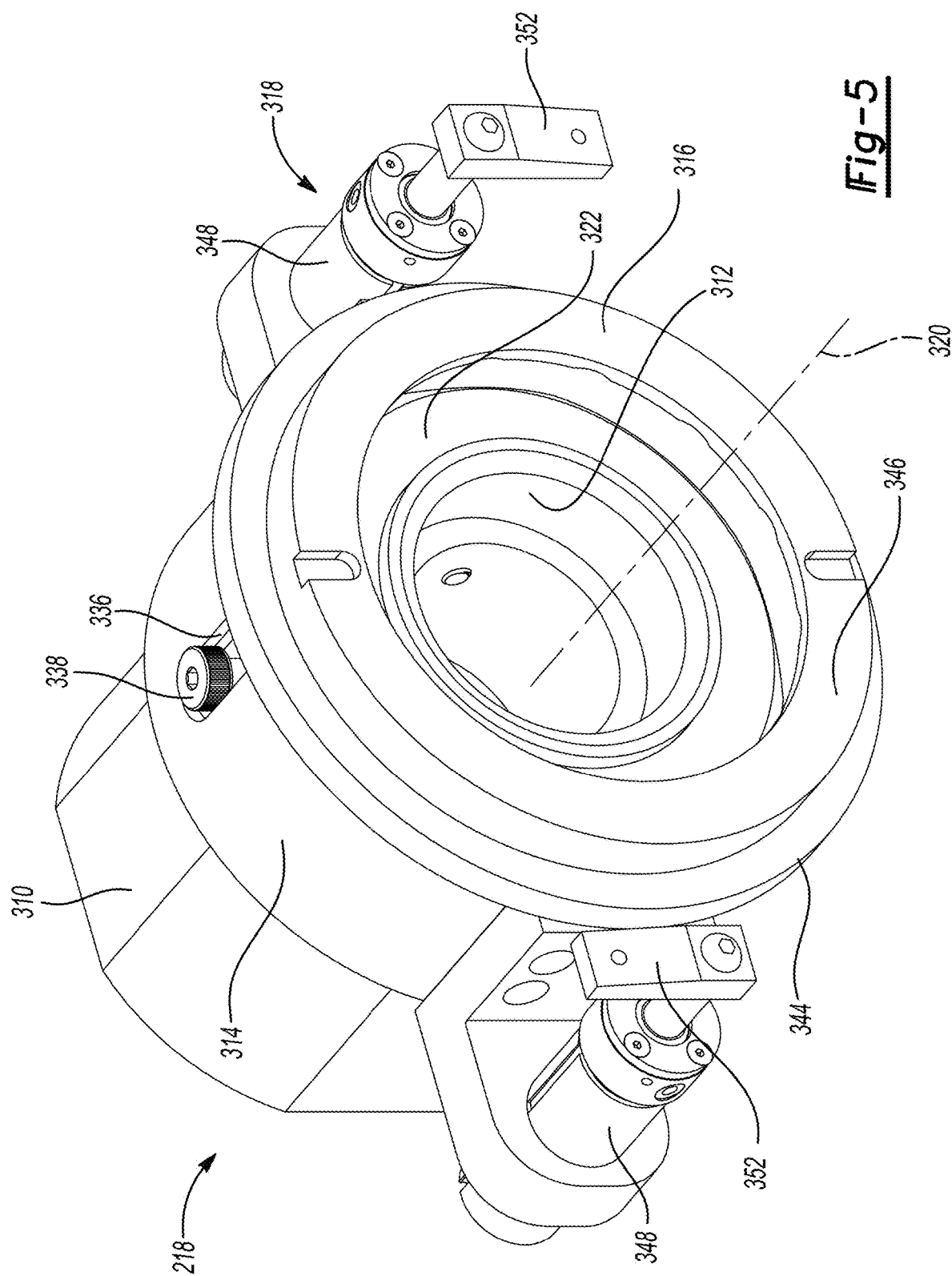
FIG. 5 is a perspective view of a first tool of the tool assembly of FIG. 4.
Figure 6:
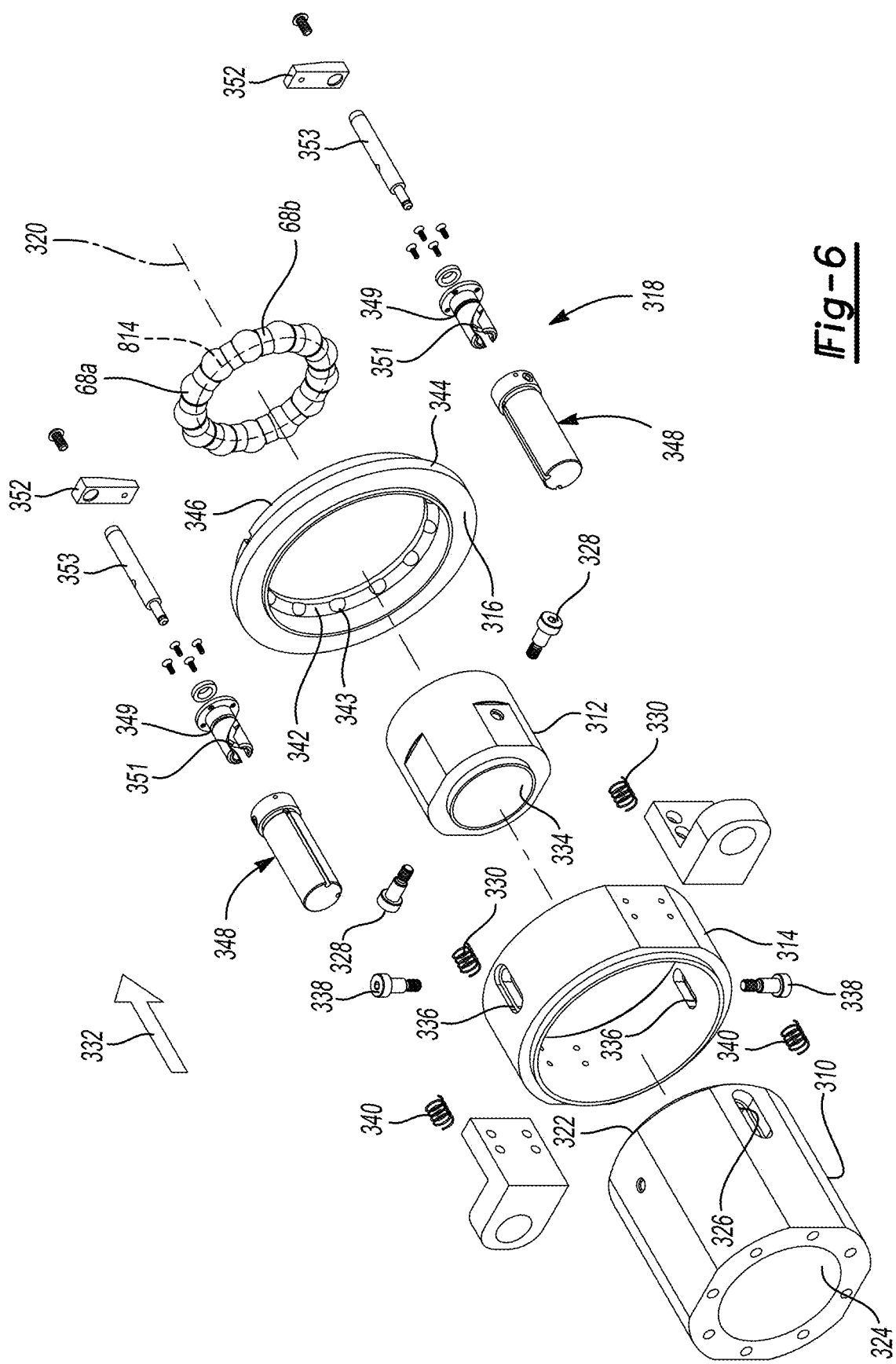
FIG. 6 is an exploded perspective view of the first tool of FIG. 5, illustrated with an arrangement of bearing elements in accordance with the teachings of the present disclosure.

Referring to FIGS. 5 and 6, the first tool 218 includes a push sleeve 310, an inner sleeve 312 (also referred to herein as the first alignment member), an outer sleeve 314, a second alignment member 316, and a clamping device 318. The push sleeve 310 is fixedly coupled to the base 214 (FIG. 4). The push sleeve 310 is disposed about a first loading axis 320 and has a push surface 322 at the axial end opposite the base 214 (FIG. 4). The push sleeve 310 can define a central bore 324 that is centered on the first loading axis 320. In the example provided, the push sleeve 310 defines a pair of slots 326 (one of which is shown in FIG. 6) through diametrically opposite sides of the push sleeve 310. The slots 326 are open into the central bore 324 and extend longitudinally parallel to the first loading axis 320.

The inner sleeve 312 is annularly disposed about the first loading axis 320 and is received within the central bore 324 of the push sleeve 310. The inner sleeve 312 is axially translatable relative to the push sleeve 310. In the example provided, a pair of lugs 328 are coupled to diametrically opposite sides of the inner sleeve 312 and extend radially outward therefrom. Each lug 328 is received in a corresponding one of the slots 326 of the push sleeve 310 to permit relative axial movement and inhibit relative rotation between the push sleeve 310 and the inner sleeve 312. One or more biasing members (e.g., springs 330) can be positioned to bias the inner sleeve 312 in an axial direction 332. In the example shown, two springs 330 are included with each engaging a corresponding one the lugs 328 and the push sleeve 310. In an alternative configuration, not specifically shown, one or more springs 330 can directly engage the inner sleeve 312 and the push sleeve 310. In the example provided, the inner sleeve 312 defines a central bore 334 that is configured to receive vacuum suction from the base 214 (FIG. 4).

The outer sleeve 314 is disposed concentrically about the push sleeve 310 and is axially translatable relative to the push sleeve 310. In the example provided, the outer sleeve 314 defines a pair of slots 336 through diametrically opposite sides of the outer sleeve 314. A pair of lugs 338 are coupled to diametrically opposite sides of the push sleeve 310 and extend radially outward therefrom. Each lug 338 is received in a corresponding one of the slots 336 of the outer sleeve 314 to permit relative axial movement and inhibit relative rotation between the push sleeve 310 and the outer sleeve 314. One or more biasing members (e.g., springs 340) can be positioned to bias the outer sleeve 314 in the axial direction 332. In the example provided, two springs 340 engage corresponding ones of the lugs 338 and the outer sleeve 314. In an alternative configuration, not specifically shown, one or more springs can directly engage the outer sleeve 314 and the push sleeve 310.

The second alignment member 316 is an annular body that includes an annular ramp surface 342, a lip 344, and a lower terminal end 346. The annular ramp surface 342 may optionally include a plurality of recesses 343 that have a spherical concave shape so that each recess 343 receives and locates a corresponding one of the bearing balls 68a.

The clamping device 318 is configured to releasably couple the second alignment member 316 to the outer sleeve 314 when concentrically disposed therewith. In the example provided, the clamping device 318 includes a pair of actuators 348 mounted to the exterior of the outer sleeve 314. Each actuator 348 is configured to move a corresponding clamp member 352 between a clamped position wherein the clamp members 352 grip the lip 344 of the second alignment member 316 and a released position wherein the second alignment member 316 is free to drop axially relative to the outer sleeve 314. In the example provided, the actuators 348 can move the clamp member 352 axially and rotate the clamp members 352 in order to engage and disengage the lip 344, though other motions can be used. In the example provided, each actuator 348 includes sleeve 349 that defines a groove or track 351 along which a follower pin (not specifically shown) on a shaft 353 of the clamp member 352 can ride. The track 351 extends axially and circumferentially along the sleeve 349 to cause the clamp member 352 to rotate. In the example provided, the actuators 348 are pneumatically powered, though other configurations can be used such as electrically powered actuators for example.

Figure 10:
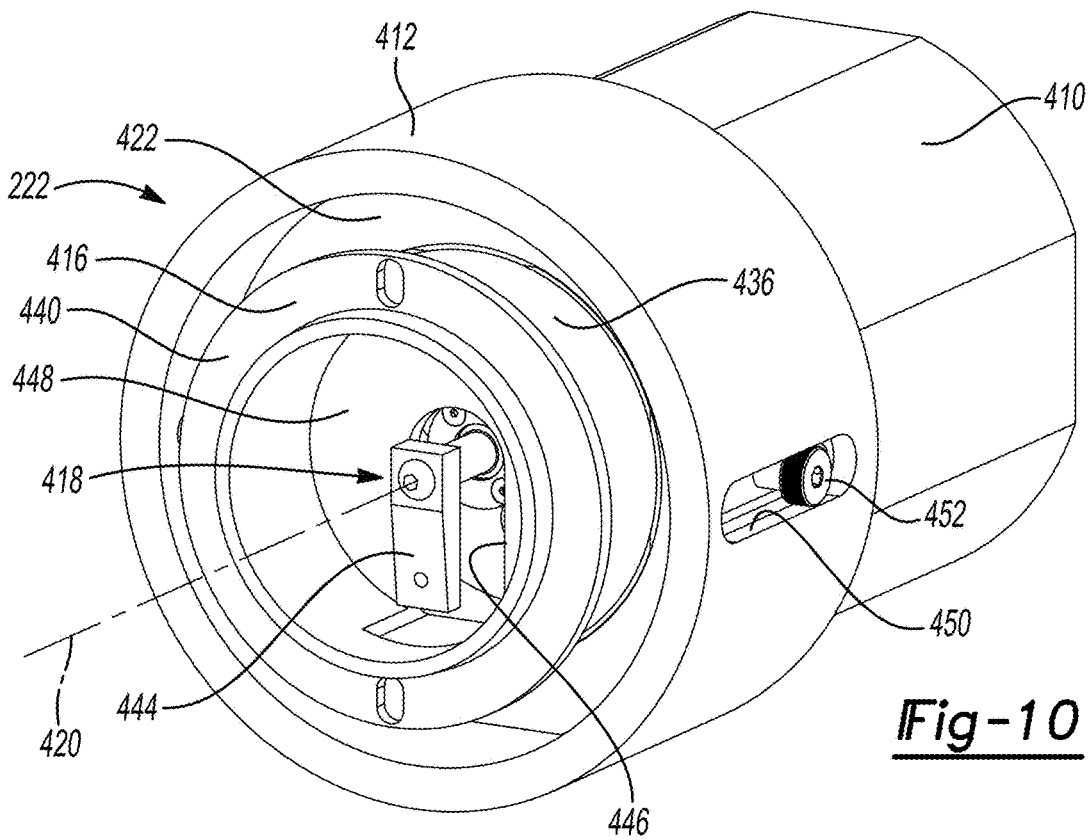
FIG. 10 is a perspective view of a second tool of the tool assembly of FIG. 4.
Figure 11:
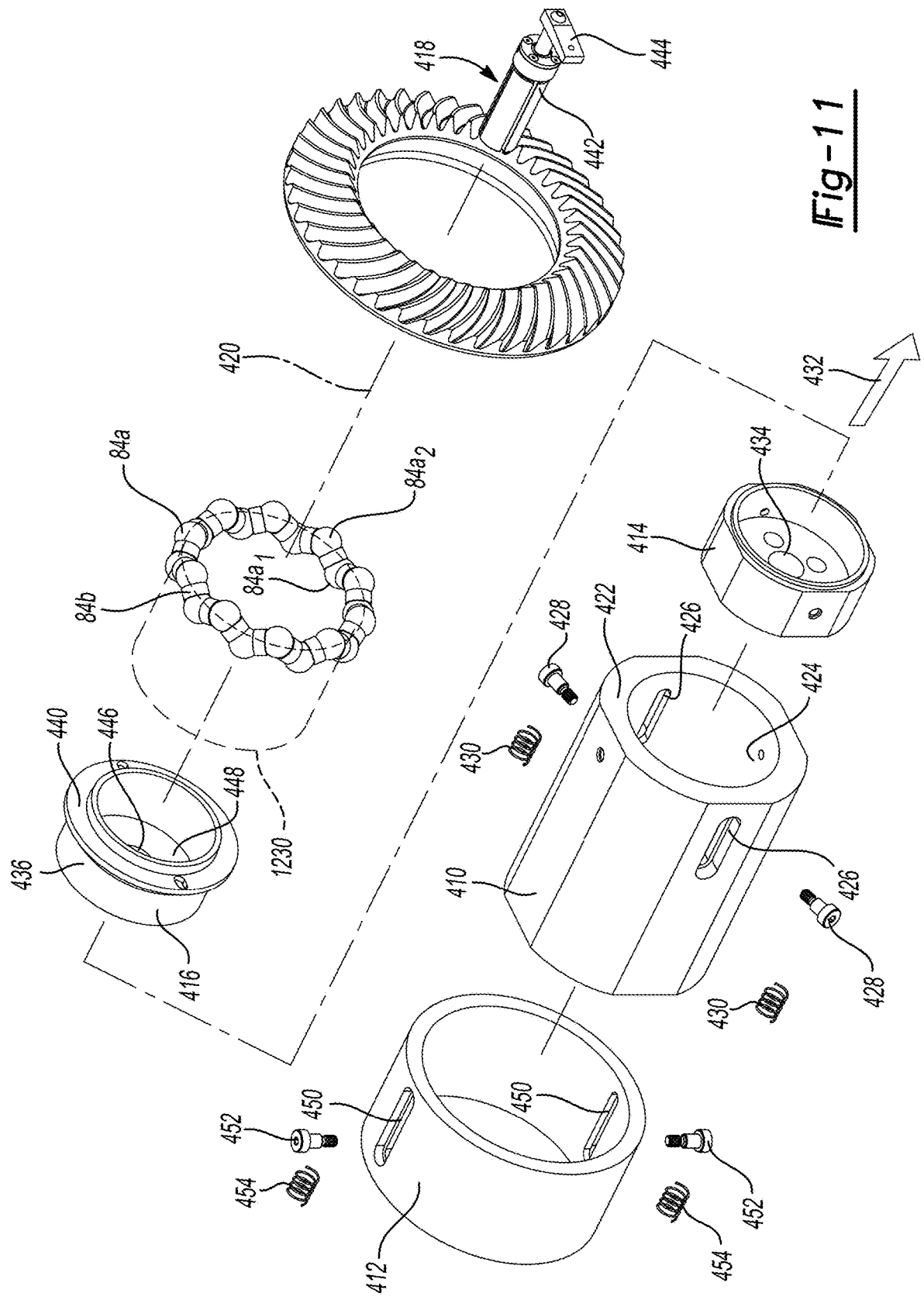
FIG. 11 is an exploded perspective view of the second tool of FIG. 5, illustrated with an arrangement of bearing elements in accordance with the teachings of the present disclosure.

Referring to FIGS. 10 and 11, the second tool 222 includes a push sleeve 410, an outer sleeve 412 (also referred to herein as the first alignment member), an inner sleeve 414, a second alignment member 416, and a clamping device 418. The push sleeve 410 is fixedly coupled to the base 214 (FIG. 4). The push sleeve 410 is disposed about a second loading axis 420 and has a push surface 422 at the axial end opposite the base 214 (FIG. 4). The push sleeve 410 can define a central bore 424 coaxial with the second loading axis 420. In the example provided, the push sleeve 410 defines a pair of slots 426 through diametrically opposite sides of the push sleeve 410. The slots 426 are open into the central bore 424 and extend longitudinally parallel to the second loading axis 420.

The inner sleeve 414 is annularly disposed about the second loading axis 420 and is received concentrically within the central bore 424 of the push sleeve 410. The inner sleeve 414 is axially translatable relative to the push sleeve 410. In the example provided, a pair of lugs 428 are coupled to diametrically opposite sides of the inner sleeve 414 and extend radially outward therefrom. Each lug 428 is received in a corresponding one of the slots 426 of the push sleeve 410 to permit relative axial movement and inhibit relative rotation between the push sleeve 410 and the inner sleeve 414. One or more biasing members (e.g., springs 430) can be positioned to bias the inner sleeve 414 in an axial direction 432. In the example provided, two springs 430 are included with each engaging a corresponding one the lugs 428 and the push sleeve 410. In an alternative configuration, not specifically shown, one or more springs 430 can directly engage the inner sleeve 414 and the push sleeve 410. In the example provided, the inner sleeve 414 defines a central bore 434 and the clamping device is disposed within the central bore 434.

Figure 12:
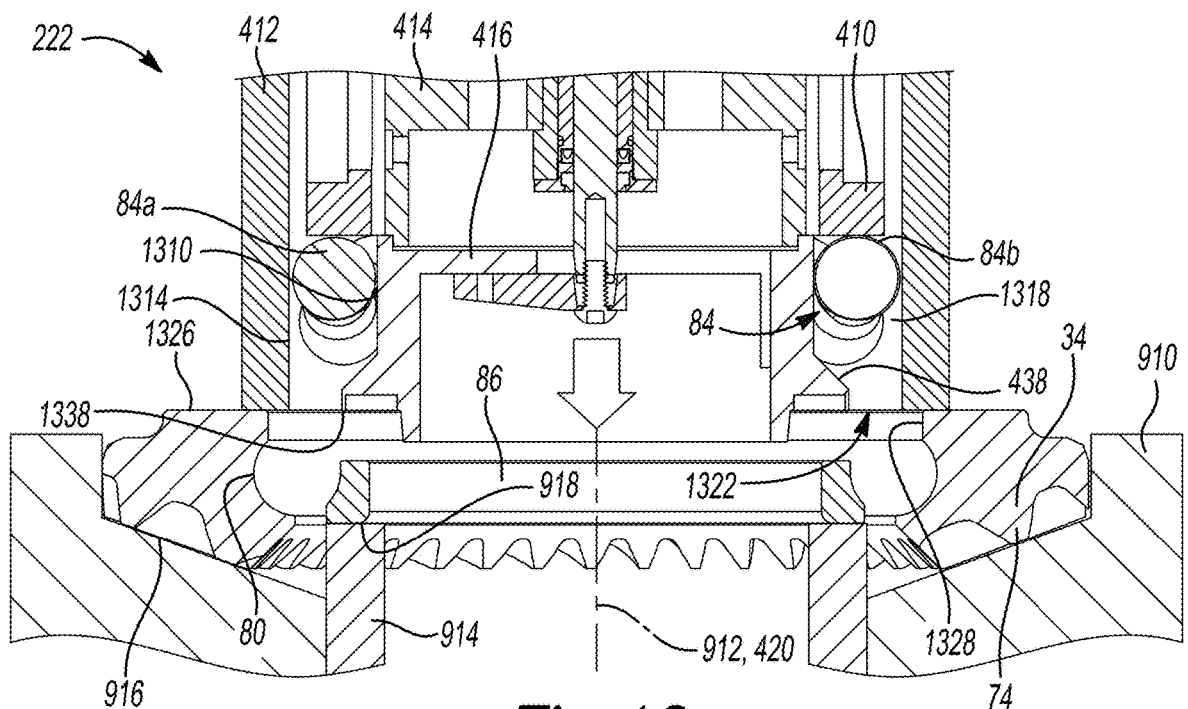
FIG. 12 is a cross-sectional view of the second tool of FIGS. 10 and 11, illustrated in a first position of a bearing assembly procedure according to the teachings of the present disclosure.

The second alignment member 416 includes a cylindrical body 436 and an annular ramp surface 438 (shown in FIG. 12). The clamping device 418 is configured to releasably couple the second alignment member 416 concentrically to the inner sleeve 414. In the example provided, the clamping device 418 includes an actuator 442 received through the central bore 434 and mounted to the inner sleeve 414. The actuator 442 is configured to move a clamp member 444 between a clamped position (shown in FIG. 12) wherein the clamp member 444 extends through an aperture 446 in the cylindrical body 436 of the second alignment member 416 to grip a lip or surface 448 of the cylindrical body 436 and a released position (shown in FIG. 10) wherein the second alignment member 416 is free to drop axially relative to the inner sleeve 414. In the example provided, the actuator 442 can move the clamp member 444 axially and rotate the clamp member 444 in order to engage and disengage the surface 448, though other motions can be used. In the example provided, the actuator 442 and clamp member 444 can be constructed similarly to the actuator 348 and clamp member 352 described above. In the example provided, the actuator 442 is pneumatically powered, though other configurations can be used such as electrically powered actuators for example.

The outer sleeve 412 is disposed concentrically about the push sleeve 410 and is axially translatable relative to the push sleeve 410. In the example provided, the outer sleeve defines a pair of slots 450 through diametrically opposite sides of the outer sleeve 412. A pair of lugs 452 are coupled to diametrically opposite sides of the push sleeve 410 and extend radially outward therefrom. Each lug 452 is received in a corresponding one of the slots 450 of the outer sleeve 412 to permit relative axial movement and inhibit relative rotation between the push sleeve 410 and the outer sleeve 412. One or more biasing members (e.g., springs 454) can be positioned to bias the outer sleeve 412 in the axial direction 432. In the example shown, two springs 454 are included with each engaging a corresponding one of the lugs 452 and the outer sleeve 412. In an alternative configuration, not specifically shown, one or more springs 454 can directly engage the outer sleeve 412 and the push sleeve 410.

Figure 7:
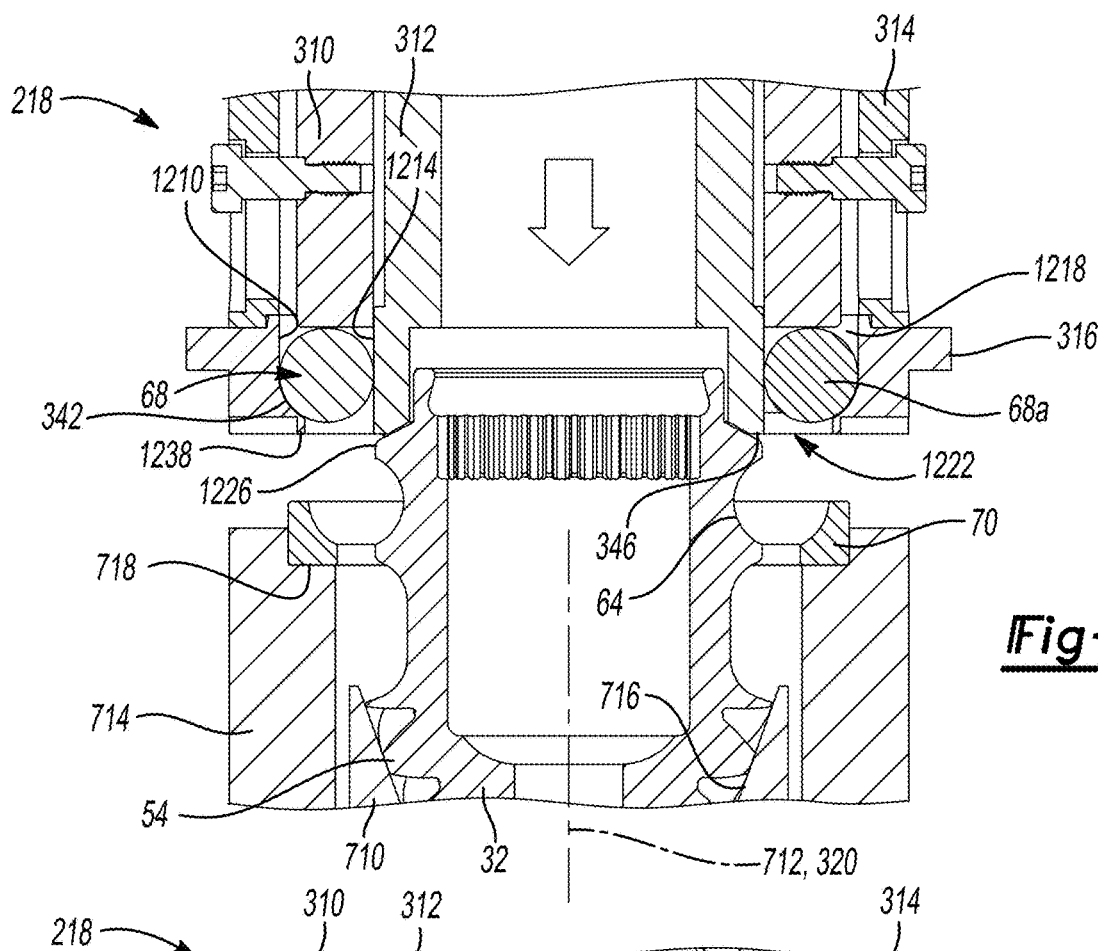
FIG. 7 is a cross-sectional view of the first tool of FIGS. 5 and 6, illustrated in a first position of a bearing assembly procedure according to the teachings of the present disclosure.
Figure 8:
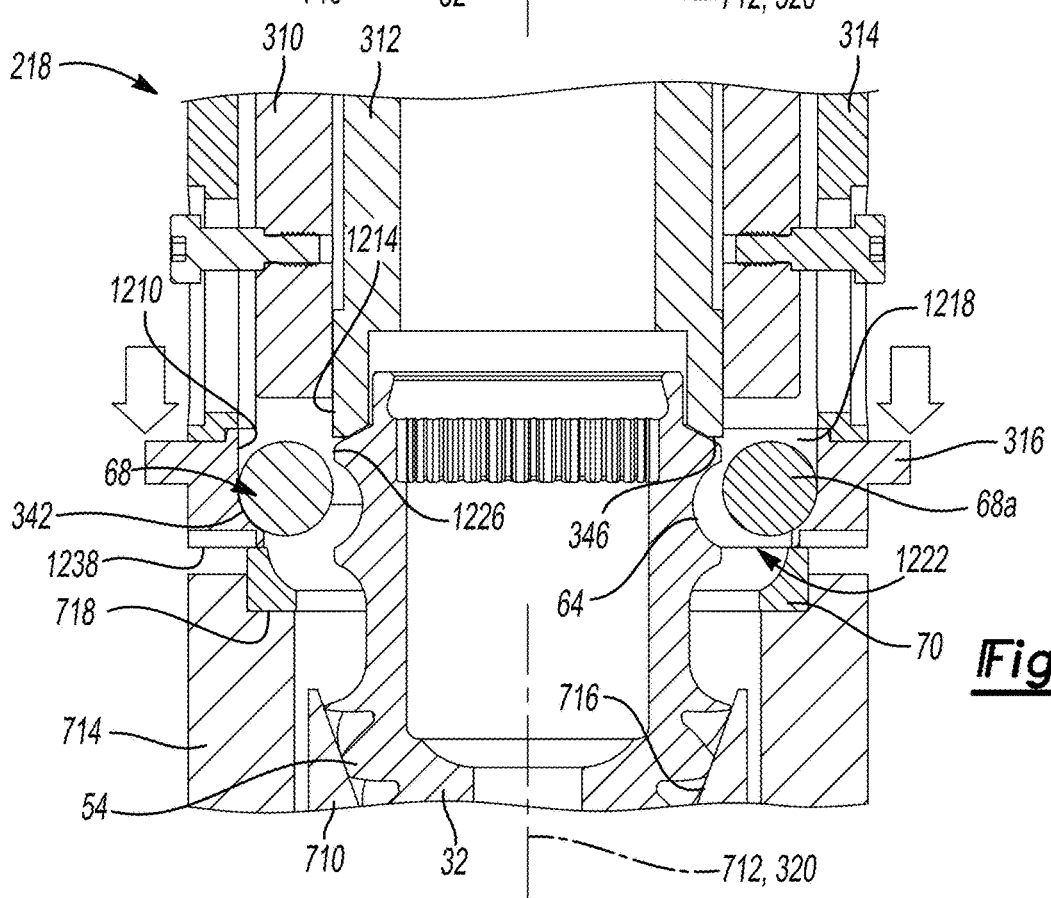
FIG. 8 is a cross-sectional view of the first tool similar to FIG. 7, illustrated in a second position of the bearing assembly procedure according to the teachings of the present disclosure.
Figure 9:
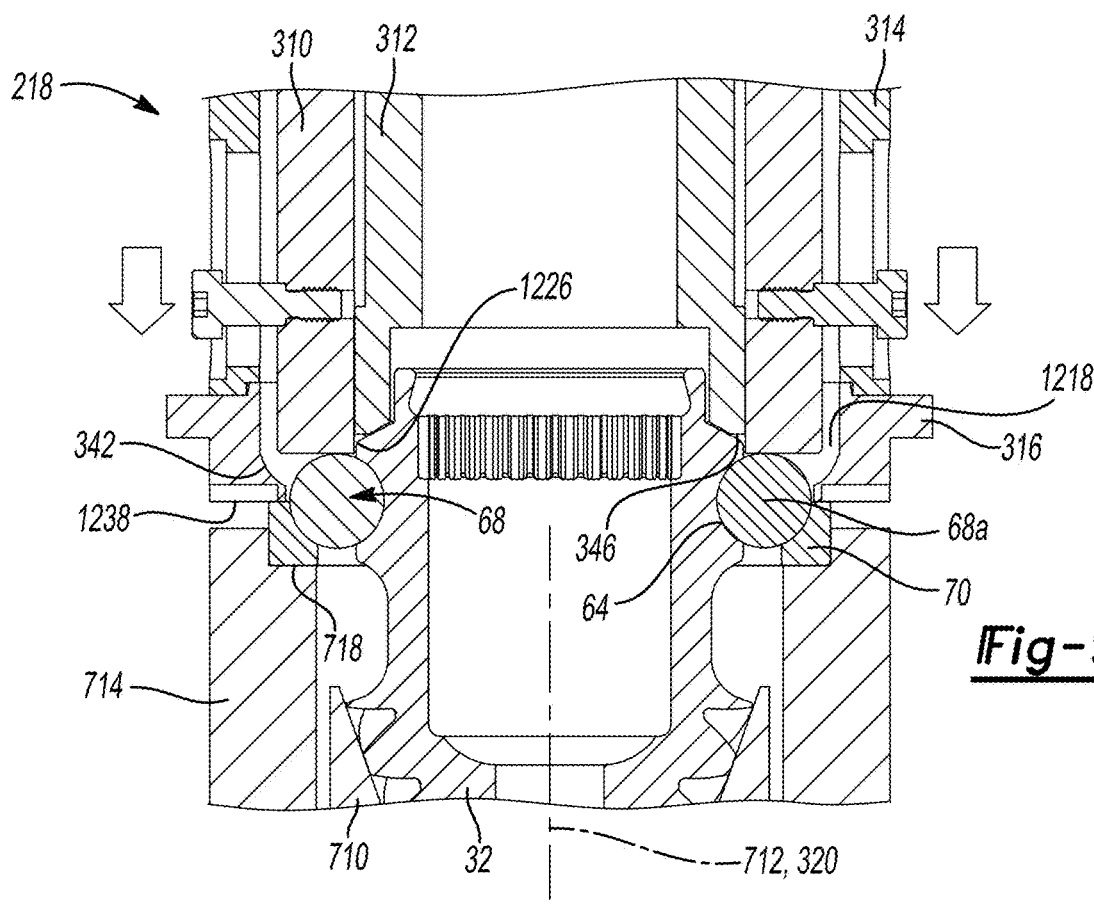
FIG. 9 is a cross-sectional view of the first tool similar to FIG. 8, illustrated in a third position of the bearing assembly procedure according to the teachings of the present disclosure.

Returning to FIG. 3, the pinion fixture 122 includes a pinion support structure 710 (also referred to herein as the first support structure) disposed about a pinion support axis 712 and a race support structure 714 (also referred to herein as a second support structure) disposed concentrically about the pinion support structure 710. As shown in FIGS. 7-9, the pinion support structure 710 has a pinion support surface 716 that can engage the input pinion 32 in order to support the input pinion 32 such that the rotational axis of the input pinion 32 is coaxial with the pinion support axis 712. In the example provided, the pinion support surface 716 defines a generally conically shaped cavity such that the pinion teeth 54 of the input pinion 32 are supported by the pinion support surface 716, though other configurations can be used.

The race support structure 714 includes an annular race support surface 718 configured to support the first outer race member 70 coaxial with the pinion support axis 712. The race support structure 714 is axially movable relative to the pinion support structure 710. In the example provided, an actuator 720 (FIG. 3) is connected to the race support structure 714 and configured to move the race support structure 714 along the pinion support axis 712 between the position shown in FIG. 7 and the position shown in FIG. 8.

The actuator 720 can be any suitable type of linear actuator, such as a pneumatic piston actuator or a solenoid actuator for example. In an alternative configuration, not specifically shown, the actuator 720 can be configured to move the pinion support structure 710 while the race support structure 714 remains stationary. In an alternative configuration, not specifically shown, a return spring can bias the race support structure 714 axially toward the position shown in FIG. 7 and the actuator 720 may optionally be omitted such that the first tool 218 can contact and push the race support structure 714 to overcome the return spring and move the race support structure 714 to the position shown in FIG. 8.

Returning to FIG. 3, the pinion bearing fixture 126 includes an inner cylinder 810 and the second alignment member 316. The second alignment member 316 can be disposed concentrically about the inner cylinder 810 to define an annular space within which the pinion bearing elements 68 can be arranged, alternating between bearing balls 68a (labeled in FIG. 6) and spacers 68b (labeled in FIG. 6). When arranged between the inner cylinder 810 and the second alignment member 316, the center of each bearing ball 68a (labeled in FIG. 6) and the center of each spacer 68b (labeled in FIG. 6) is distributed along a staging circle or staging cylinder (not specifically shown) having a larger diameter than a circle (not specifically shown) along which the centers of the pinion bearing elements 68 are distributed when installed as shown in FIG. 2.

Referring to FIG. 4, the third tool 226 includes a first gripper 510 and a first retention device 512. The first gripper 510 includes a plurality of fingers 514 spaced about a third loading axis 516 of the third tool 226. The fingers 514 are movable relative to the base 214 and configured to grip and release parts such as the first outer race member 70 (FIG. 2) and the second outer race member 72 (FIG. 2). In the example provided, the fingers 514 are moved by one or more pneumatic actuators (not shown), though other configurations can be used such as electronic actuators for example.

The first retention device 512 is configured to engage and support the input pinion 32 (FIG. 2) for motion with the third tool 226. In the example provided, the first retention device 512 includes a vacuum cap 518 disposed radially inward of the fingers 514, though other configurations can be used, such as additional fingers (not shown) or magnets (not shown) for example. The vacuum cap 518 defines a suction aperture 522. The suction aperture 522 is in fluid communication with a vacuum source (not shown) via the base 214. The vacuum cap 518 may be axially fixed relative to the base 214 or may be axially movable relative to the base 214. The vacuum cap 518 is configured to form a seal with the axial end 60 (FIG. 2) of the shaft 52 of the input pinion 32 (FIG. 2) while the suction aperture 522 can provide suction to the internal cavity 58 (FIG. 2) to secure the input pinion 32 (FIG. 2) to the third tool 226. In one optional configuration, a spring (not shown) may bias the vacuum cap 518 axially relative to the base 214 such that the vacuum cap 518 is biased into sealing contact with the input pinion 32 (FIG. 2).

The fourth tool 228 includes a second gripper 610 and a second retention device 612. The second gripper 610 includes a plurality of fingers 614 spaced about a fourth loading axis 616 of the fourth tool 228. The fingers 614 are movable relative to the base 214 and configured to grip and release parts such as the first inner race member 86 (FIG. 2) and the second inner race member 88 (FIG. 2). In the example provided, the fingers 614 are moved by one or more pneumatic actuators (not shown), though other configurations can be used such as electronic actuators for example. The second retention device 612 is configured to engage and support the ring gear 34 (FIG. 2) for motion with the fourth tool 228. In the example provided, the second retention device 612 includes a plurality of magnets 618 with each mounted on a corresponding pneumatic cylinder 620 spaced about the fourth loading axis 616, though other configurations can be used, such as additional fingers (not shown), electromagnets (not shown), or suction devices (not shown) for example.

Figure 13:
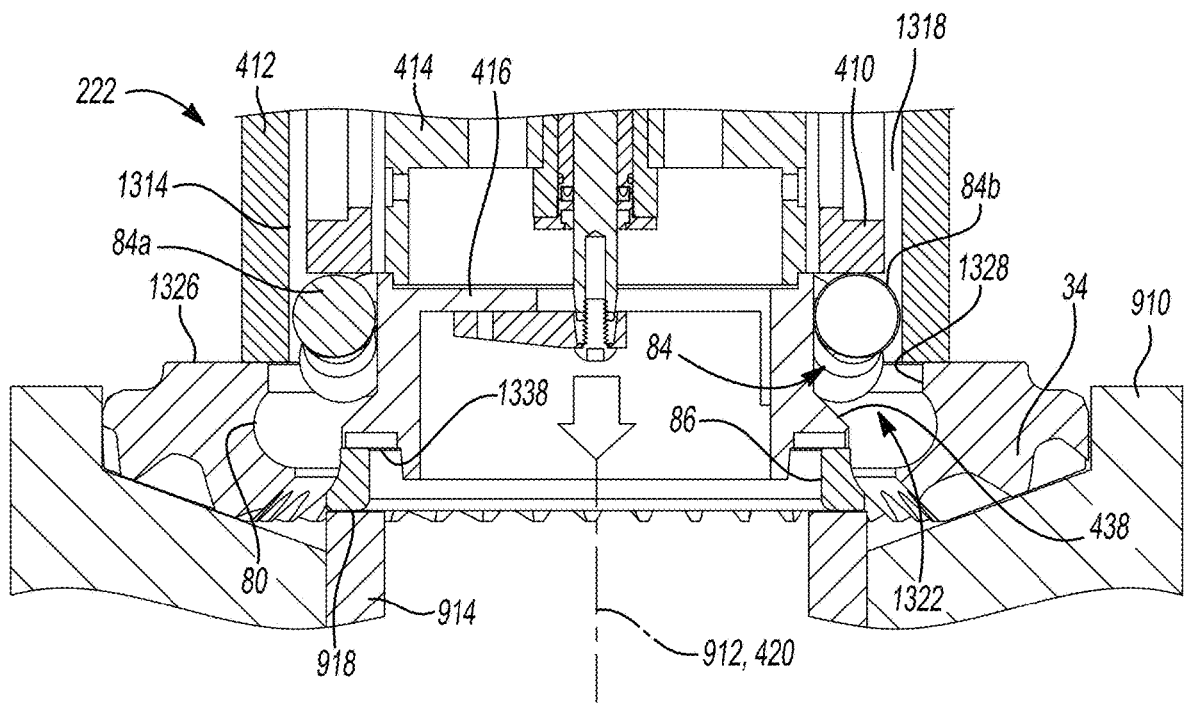
FIG. 13 is a cross-sectional view of the second tool similar to FIG. 12, illustrated in a second position of the bearing assembly procedure according to the teachings of the present disclosure.
Figure 14:
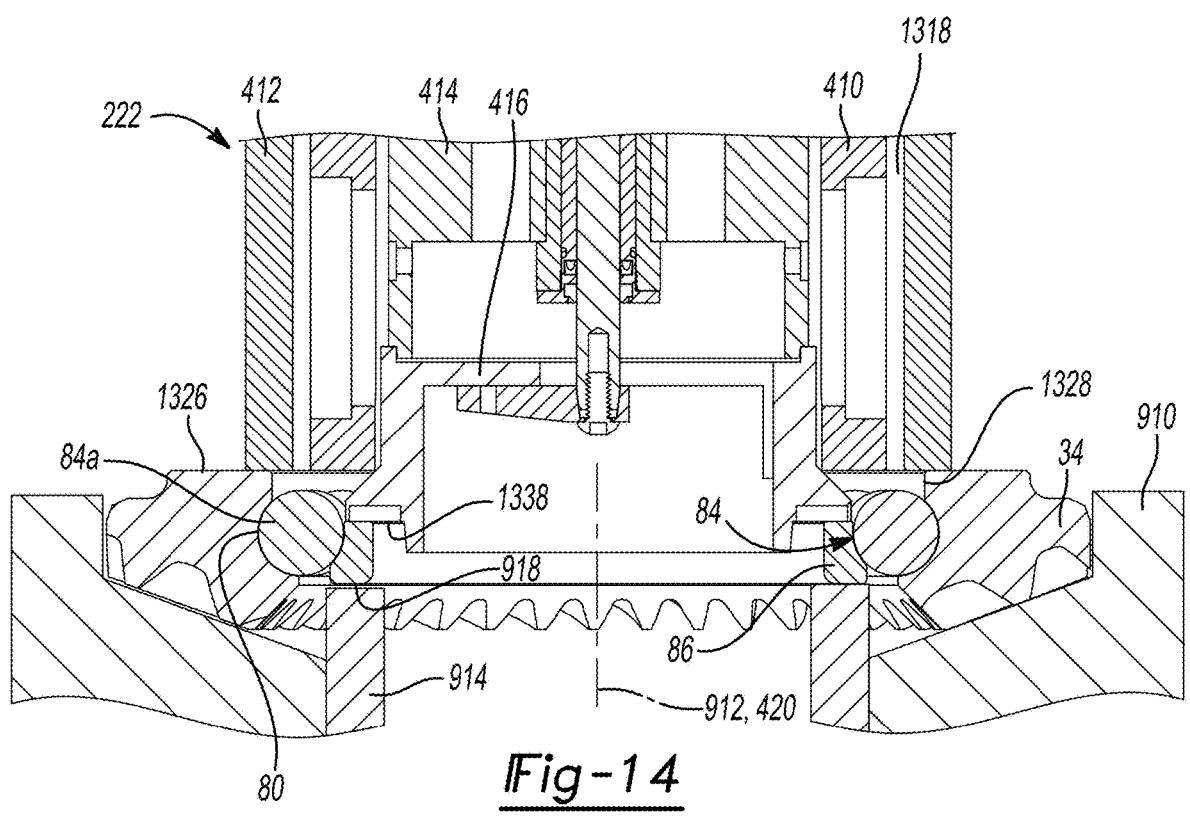
FIG. 14 is a cross-sectional view of the second tool similar to FIG. 13, illustrated in a third position of the bearing assembly procedure according to the teachings of the present disclosure.

Referring to FIG. 3, the ring gear fixture 130 includes a ring gear support structure 910 (also referred to herein as the first support structure) disposed about a ring gear support axis 912 and a race support structure 914 (also referred to herein as the second support structure). The ring gear support structure 910 is disposed concentrically about the race support structure 914. As shown in FIGS. 12-14, the ring gear support structure 910 has a ring gear support surface 916 that can engage the ring gear 34 in order to support it such that the rotational axis of the ring gear 34 is coaxial with the ring gear support axis 912. In the example provided, the ring gear support surface 916 defines a generally conically shaped cavity such that the teeth 74 of the ring gear 34 are supported by the ring gear support surface 916, though other configurations can be used.

The race support structure 914 includes a race support surface 918 configured to support the first inner race member 86 centered on the ring gear support axis 912. The race support structure 914 is axially movable relative to the ring gear support structure 910. In the example provided, an actuator 920 (FIG. 3) is connected to the race support structure 914 and configured to move the race support structure 914 along the ring gear support axis 912 between the position shown in FIG. 12 and the position shown in FIG. 13. The actuator 920 can be any suitable type of linear actuator, such as a pneumatic piston actuator or a solenoid actuator for example. In an alternative configuration, not specifically shown, the actuator 920 can be configured to move the ring gear support structure 910 while the race support structure 914 remains stationary. In an alternative configuration, not specifically shown, a return spring can bias the race support structure 914 axially toward the position shown in FIG. 13 and the actuator 920 may optionally be omitted such that the second tool 222 can contact and push the race support structure 914 to overcome the return spring and move the race support structure 914 to the position shown in FIG. 13.

Returning to FIG. 3, the ring gear bearing fixture 134 includes an outer cylinder 1010 and the second alignment member 416. The outer cylinder 1010 can be disposed concentrically about the second alignment member 416 to define an annular space within which the ring gear bearing elements 84 can be arranged, alternating between bearing balls 84*a* (labeled in FIG. 11) and spacers 84*b* (labeled in FIG. 11). When arranged between the outer cylinder 1010 and the second alignment member 416, the center of each bearing ball 84*a* (labeled in FIG. 11) and the center of each spacer 84*b* (labeled in FIG. 11) is distributed along a staging cylinder (not specifically shown) having a smaller diameter than a circle (not specifically shown) along which the centers of the ring gear bearing elements 84 are distributed when installed as shown in FIG. 2. When arranged between the outer cylinder 1010 and the second alignment member 416, adjacent bearing balls 84*a* (labeled in FIG. 11) are axially offset from one another along the cylinder (not specifically shown) along which the centers of the bearing balls 84*a* (labeled in FIG. 11) are distributed. In other words, the bearing balls 84*a* (labeled in FIG. 11) include a set of first balls 84*a*1 (labeled in FIG. 11) that are axially offset from a set of second balls 84*a*2 (labeled in FIG. 11), with each first ball 84*a*1 (labeled in FIG. 11) being disposed circumferentially between a corresponding pair of the second balls 84*a*2 (labeled in FIG. 11).

Referring to FIG. 3, in operation, the controller 146 can operate the positioning device 138, the tool assembly 142, and the fixtures 122, 130 to assemble the pinion bearing 62 (FIG. 2) about the input pinion 32 and assemble the ring gear bearing 78 (FIG. 2) within the ring gear 34 as described in greater detail below. The controller 146 can also optionally operate the positioning device 138 and the tool assembly 142 to position the input pinion 32 with the assembled pinion bearing 62 (FIG. 2) and the ring gear 34 with the assembled ring gear bearing 78 (FIG. 2) into the housing assembly 30 in the position shown in FIG. 2.

In the example provided, a pinion staging fixture 1110 supports the input pinion 32 concentrically with the outer race 66 and a ring gear staging fixture 1112 supports the ring gear 34 concentrically with the inner bearing race 82. A housing staging fixture 1114 can optionally support the housing assembly 30.

With reference to FIGS. 3 and 4, the process of the tool assembly 142 assembling the input pinion 32 with the pinion bearing 62 (FIG. 2) is described. The input pinion 32 and the outer bearing race 66 are positioned on the pinion staging fixture 1110 and the positioning device 138 moves the third tool 226 to be concentric with the input pinion 32. The first gripper 510 can then grip the outer bearing race 66 while the input pinion 32 is secured to the tool assembly 142 by the first retention device 512. The positioning device 138 can then move the third tool 226 until the rotational axis of the input pinion 32 is aligned with the pinion support axis 712 of the pinion fixture 122. The first retention device 512 can then release the input pinion 32 so that it is supported by the pinion support surface 716 (FIG. 7) and the first gripper 510 can release the outer bearing race 66 so that the first outer race member 70 is supported by the race support surface 718 (FIG. 7) concentrically with the input pinion 32. The first gripper 510 can then grip the second outer race member 72 and remove it from the pinion fixture 122.

The pinion bearing elements 68 are arranged in the pinion bearing fixture 126 as discussed above. The first tool 218 (without the second alignment member 316, which is located in the pinion bearing fixture 126 at this point) is moved to be coaxial with the pinion bearing fixture 126. The clamping device 318 is activated to clamp the second alignment member 316 to the outer sleeve 314.

Referring to FIGS. 7-9, with the second alignment member 316 clamped to the outer sleeve 314, an inward facing cylindrical surface 1210 of the second alignment member 316 is spaced apart from an outward facing cylindrical surface 1214 (i.e., cylindrical alignment surface) of the inner sleeve 312 to define an annular loading chamber 1218. The distance between the inward facing cylindrical surface 1210 and the outward facing cylindrical surface 1214 is slightly larger than the diameter of each bearing ball 68a such that the arrangement of pinion bearing elements 68 is received in the annular loading chamber 1218 when the second alignment member 316 is clamped to the outer sleeve 314. The annular ramp surface 342 is angled to extend radially inward from the inward facing cylindrical surface 1210 to the lower terminal end 346 to define a gap 1222 with the outward facing cylindrical surface 1214. The gap 1222 is smaller than the diameter of each bearing ball 68a and each spacer 68b (shown in FIG. 6) such that the pinion bearing elements 68 are inhibited from falling out of the annular loading chamber 1218. The positioning device 138 (FIG. 3) can then move the first tool 218 to be above and coaxial to the input pinion 32 as shown in FIG. 7.

The actuator 720 (FIG. 3) can be operated to move the race support structure 714 axially downward relative to the pinion support structure 710, so that the first outer race member 70 is axially offset from the inner bearing race 64 in the manner shown in FIG. 8. The first tool 218 can then move axially downward until the inner sleeve 312 contacts a shoulder 1226 of the inner bearing race 64. The outward facing cylindrical surface 1214 has a diameter that is approximately equal to or slightly larger than the shoulder 1226 of the inner bearing race 64. Thus, the centers of the bearing balls 68a are distributed along a loading cylinder or loading circle 814 (shown in FIG. 6) that has a diameter that is greater than a diameter of a circle (not specifically shown) along which the centers of the bearing balls 68a are distributed when seated in the inner bearing race 64 as shown in FIG. 9. In the example provided, the loading cylinder or loading circle 814 has a diameter equal to that of the corresponding staging cylinder (not specifically shown).

The push sleeve 310 and the outer sleeve 314 can continue to move axially downward while the inner sleeve 312 remains stationary against the shoulder 1226 until in the position shown in FIG. 8. In this position, an axial end surface 1238 (i.e., race abutment surface) of the second alignment member 316 abuts the first outer race member 70 and the gap 1222 has increased to be larger than the diameter of the bearing balls 68a and the spacers 68b (FIG. 6). As such, the pinion bearing elements 68 are released and can fall under gravity into the inner bearing race 64, guided by the ramp surface 342. In the example provided, the push sleeve 310 may also continue to move downward relative to the inner sleeve 312 and the outer sleeve 314 (e.g., to an extended position) to push the pinion bearing elements 68 into the inner bearing race 64.

After the pinion bearing elements 68 are seated in the inner bearing race 64, the actuator 720 (FIG. 3) can be operated again while the first tool 218 retracts in order to move the first outer race member 70 upwards to engage the pinion bearing elements 68 as shown in FIG. 9. The first gripper 510 (FIG. 4) may then place the second outer race member 72 (FIG. 3) on top of the first outer race member 70 and the third tool 226 (FIG. 4) may optionally move the input pinion 32 with the assembled pinion bearing 62 (FIG. 2) together as a subassembly, such as into the housing assembly 30 (FIG. 3).

Returning to FIGS. 3 and 4, the process of the tool assembly 142 assembling the ring gear 34 with the ring gear bearing 78 (FIG. 2) is described. The ring gear 34 and the inner bearing race 82 are positioned on the ring gear staging fixture 1112 and the positioning device 138 moves the fourth tool 228 to be coaxial with the ring gear 34. The second gripper 610 can then grip the inner bearing race 82 while the ring gear 34 is secured to the tool assembly 142 by the second retention device 612. The positioning device 138 can then move the fourth tool 228 until the rotational axis of the ring gear 34 is aligned with the ring gear support axis 912 of the ring gear fixture 130. The second retention device 612 can then release the ring gear 34 so that the ring gear 34 is supported by the ring gear support surface 916 (FIG. 12) and the second gripper 610 can release the inner bearing race 82 so that the first inner race member 86 is supported by the race support surface 918 (FIG. 12) concentrically with the ring gear 34. The second gripper 610 can then grip the second race member 88 (FIG. 2) and remove it from the ring gear fixture 130.

The ring gear bearing elements 84 are arranged in the ring gear bearing fixture 134 as discussed above. The second tool 222 (without the second alignment member 416, which is located in the pinion bearing fixture 126 at this point) is moved to be coaxial with the ring gear bearing fixture 134. The clamping device 418 (FIGS. 10 and 11) is activated to clamp the second alignment member 416 to the inner sleeve 414 (FIG. 11).

Referring to FIGS. 12-14, with the second alignment member 416 clamped to the inner sleeve 414, an outward facing cylindrical surface 1310 of the second alignment member 416 is spaced apart from an inward facing cylindrical surface 1314 (i.e., cylindrical alignment surface) of the outer sleeve 412 to define an annular loading chamber 1318. The distance between the outward facing cylindrical surface 1310 and the inward facing cylindrical surface 1314 is slightly larger than the diameter of each bearing ball 84a such that the arrangement of ring gear bearing elements 84 is received in the annular loading chamber 1318 when the second alignment member 416 is clamped to the inner sleeve 414. The annular ramp surface 438 is angled to extend radially outward from the outward facing cylindrical surface 1310 to an axial end surface 1338 to define a gap 1322 with the inward facing cylindrical surface 1314. The gap 1322 is smaller than the diameter of each bearing ball 84*a* and each spacer 84*b* such that the ring gear bearing elements 84 are inhibited from falling out of the annular loading chamber 1318. The positioning device 138 (FIG. 3) can then move the second tool 222 to be above and coaxial to the ring gear 34 as shown in FIGS. 12-14.

The actuator 920 (FIG. 3) can be operated to move the race support structure 914 axially downward relative to the ring gear support structure 910, so that the first inner race member 86 is axially offset from the outer bearing race 80 in the manner shown in FIG. 13. The second tool 222 then moves axially downward until the outer sleeve 412 contacts a surface 1326 of the ring gear 34. The inward facing cylindrical surface 1314 has a diameter that is approximately equal to or slightly less than a shoulder 1328 of the outer bearing race 80. Thus, the centers of the bearing balls 84*a* are distributed along a loading cylinder 1230 (shown in FIG. 11) that has a diameter that is less than a diameter of a circle (not specifically shown) along which the centers of the bearing balls 84*a* are distributed when seated in the outer bearing race 80 as shown in FIG. 14. The loading cylinder 1230 can have a diameter that is equal to the corresponding staging cylinder (not specifically shown).

The push sleeve 410 and the inner sleeve 414 can continue to move axially downward while the outer sleeve 412 remains stationary against the surface 1326 until in the position shown in FIG. 13. In this position, the axial end surface 1338 (i.e., race abutment surface) of the second alignment member 416 abuts the first inner race member 86 and the gap 1322 has increased to be larger than the diameter of each bearing ball 84*a* and each spacer 84*b*. As such, the ring gear bearing elements 84 are released and can fall under gravity into the outer bearing race 80, guided by the ramp surface 438. In the example provided, the push sleeve 410 may also continue to move downward relative to the inner sleeve 414 and the outer sleeve 412 (e.g., to an extended position) to push the ring gear bearing elements 84 into the outer bearing race 80.

After the ring gear bearing elements 84 is seated in the outer bearing race 80, the actuator 920 (FIG. 3) can be operated again while the second tool 222 retracts in order to move the first inner race member 86 upwards to engage the ring gear bearing elements 84 as shown in FIG. 14. The second gripper 610 (FIG. 4) can then place the second inner race member 88 (FIG. 2) on top of the first inner race member 86 and the fourth tool 228 (FIG. 4) may optionally move the ring gear 34 with the assembled ring gear bearing 78 (FIG. 2) together as a subassembly, such as into the housing assembly 30 (FIG. 3).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

The method steps, processes, and operations described herein are not to be construed as necessarily requiring their performance in the particular order discussed or illustrated, unless specifically identified as an order of performance. It is also to be understood that additional or alternative steps may be employed.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tooling system for assembling a subassembly to a housing, the subassembly including a rotary component body, a plurality of gear teeth, a first bearing race, a first race member of a second bearing race, and a bearing arrangement, the rotary component body being rotatable about a rotational axis, the plurality of gear teeth and the first bearing race being fixedly coupled to the rotary component body, the first race member of the second bearing race being disposed concentrically about the rotational axis, the bearing arrangement comprising a plurality of bearing balls and a plurality of spacers, each of the spacers being disposed between an adjacent pair of the bearing balls, the tooling system comprising:
   a first assembly fixture including a first support structure and a second support structure, the first support structure being configured to support the rotary component body, the second support structure being configured to support the first race member of the second bearing race concentrically about the rotational axis of the rotary component body, the second support structure being movable relative to the first support structure between a first support position and a second support position, wherein movement of the second support structure between the first and second support positions translates the first race member of the second bearing race relative to the first bearing race along the rotational axis; and
   an assembly machine including:
      a first alignment member defining a loading axis and a first cylindrical alignment surface disposed concentrically about the loading axis; and
      a second alignment member disposed concentrically about the loading axis and having a race abutment surface that is configured to abut an axial end of the first race member, the second alignment member being movable relative to the first alignment member along the loading axis between a first position and a second position;
   wherein the first cylindrical alignment surface and the second alignment member cooperate to define an annular chamber configured to receive the bearing arrangement such that the plurality of bearing balls and the plurality of spacers are disposed in an annular bearing arrangement that is centered about the loading axis; and
   wherein when the second alignment member is in the second position, an end of the first cylindrical alignment surface and an end of the second alignment member are spaced apart a greater distance than when the second alignment member is in the first position such that when in the first position the annular bearing arrangement is retained in the annular chamber and when in the second position the annular bearing arrangement is free to exit the annular chamber through an annular gap between the end of the first cylindrical alignment surface and the end of the second alignment member.

2. The tooling system according to claim 1, wherein a diameter of the first cylindrical alignment surface is either:
   a) equal to or larger than a diameter of an end of the first bearing race if the first bearing race is an inner bearing race of a bearing assembly; or
   b) equal to or smaller than a diameter of an end of the first bearing race if the first bearing race is an outer bearing race of a bearing assembly.

3. The tooling system according to claim 1, wherein the second alignment member is disposed about the first cylindrical alignment surface and the second alignment member includes a ramp that tapers radially inward toward the end of the second alignment member.

4. The tooling system according to claim 3, wherein the assembly machine further includes a push sleeve disposed concentrically between the first cylindrical alignment surface and the second alignment member, the push sleeve being movable along the loading axis relative to the first alignment member and the second alignment member between a retracted position and an extended position, wherein in the extended position the push sleeve is disposed further into the annular chamber than when in the retracted position.

5. The tooling system according to claim 4 wherein the assembly machine further includes a first biasing member and a second biasing member, the first biasing member biasing the first alignment member in a first axial direction relative to the push sleeve, the second biasing member biasing the second alignment member in the first axial direction relative to the push sleeve.

6. The tooling system according to claim 1, wherein the first cylindrical alignment surface is disposed about the second alignment member and the second alignment member includes a ramp that tapers radially outward toward the end of the second alignment member.

7. The tooling system according to claim 6, wherein the assembly machine further includes a push sleeve disposed concentrically between the first cylindrical alignment surface and the second alignment member, the push sleeve being movable along the loading axis relative to the first alignment member and the second alignment member between a retracted position and an extended position, wherein in the extended position the push sleeve is disposed further into the annular chamber than when in the retracted position.

8. The tooling system according to claim 7, wherein the assembly machine further includes a first biasing member and a second biasing member, the first biasing member biasing the first alignment member in a first axial direction relative to the push sleeve, the second biasing member biasing the second alignment member in the first axial direction relative to the push sleeve.

9. The tooling system according to claim 1, wherein the assembly machine includes a clamp member movable between a first clamp position and a second clamp position, wherein when the clamp member is in the first clamp position the clamp member engages the second alignment member to couple the second alignment member to the first alignment member, and when the clamp member is in the second clamp position the clamp member is disengaged from the second alignment member and the second alignment member is decoupled from the first alignment member.

10. The tooling system according to claim 1, wherein the assembly machine includes a tool configured to pick up and move the rotary component body with the annular bearing arrangement disposed between the first bearing race and the first race member of the second bearing race.

\* \* \* \* \*